2,786,862
Patented Mar. 26, 1957

2,786,862

PREPARATION OF DIALKYLSILANES

John K. Wolfe, Burnt Hill, and Newell C. Cook, Schenectady, N. Y., assignors to General Electric Company, a corporation of New York No Drawing. Application November 12, 1954,
Serial No. 468,546

9 Claims. (Cl. 260—448.2)

This invention relates to the preparation of dialkylsilanes ($R_2SiH_2$) containing 2 Si—C bonds and 2 Si—H bonds in which R is an alkyl radical selected from the group consisting of ethyl and propyl. More particularly, this invention relates to the reaction of a monoalkylsilane (R—$SiH_3$) with a member of the group consisting of ethylene and propylene to produce dialkylsilanes. Still more particularly, this invention relates to a temperature-controlled process for the production of dialkylsilanes from the reaction of silane ($SiH_4$) with a member of the group consisting of ethylene and propylene, where improved yields are obtained by the olefin alkylation of silane below 250° C., followed by the introduction of a second alkyl group by the olefin alkylation of this product at a temperature above 250° C. in the absence of silane.

The reaction of olefins with silane is disclosed in U. S. Patent 2,537,763 wherein silane is reacted with olefins of from 2 to 5 carbons at a temperature of 25–250° C. and preferably from 75–200° C. According to this patent, the main products of this reaction vary with the olefin employed. The higher the carbon content of the olefin, the more readily it reacts with silane to give greater substitution. For example, if ethylene is reacted with silane within this temperature range, the main product is monoethylsilane in addition to some higher boiling materials comprising higher alkylated silicon compounds, such as di- and triethylsilanes. On the other hand, if isobutylene is reacted with silane at as low a temperature as 100° C., the main product is essentially tetraisobutylsilane ($C_4H_9$)$_4$Si.

The term "alkyl" as used in the specification and claims, unless otherwise specified, refers to a member of the group consisting of ethyl and propyl. The term "olefin" as used in the specification and claims, unless otherwise specified, refers to a member of the group consisting of ethylene and propylene.

In the case of ethylene and propylene, dialkylation of silane (e. g., replacing 2 of the 4 silane hydrogens with alkyl groups) occurs most readily at temperatures of 250–450° C. But as the temperature is raised above 250° C., silane decomposes to such products as silicon, hydrogen, disilane, etc. Therefore, if dialkylation is carried out by reacting silane and an olefin above 250°, a low yield of dialkylsilane is obtained. This is particularly true if the reaction is carried out in a stainless steel (a nickel alloy) reactor since nickel tends to lower the decomposition temperature of silane. These decomposition products of silane not only remove one of the starting materials, namely, silane, but also react with the other starting material, namely, the olefin, to cause side reactions producing such compounds as alkanes, alkyldisilanes, etc.

We have now found that dialkylsilanes can be prepared in good yields by reacting a monoalkylsilane with a member of the group consisting of ethylene and propylene at 250–450° C., preferably from 300–450° C. Yields of over 80%, based on reacted monoalkylsilane, have been obtained by reacting a monoalkylsilane and an olefin at 350–400° C. and recycling the unreacted monoalkylsilane with the unreacted olefin at the same temperature. In contrast to the instability of silane at 250–450° C., we have found monoethyl- and monopropylsilanes to be relatively stable within this temperature range. For example, monoethylsilane ($C_2H_5SiH_3$) when heated at 390° C. for 15 hours exhibited little if any decomposition. Since the reaction of the monoalkylsilane with a member of the group consisting of ethylene and propylene is complete within 1 to 3 hours at 250–450° C., thermal instability of monoalkylsilane offers no problem in the introduction of the second alkyl group by olefin alkylation.

We have also discovered that dialkylsilanes can be prepared by the following temperature-controlled processes:

PROCESS I

By our preferred embodiment, the first alkyl group was introduced by the reaction of silane with a member of the group consisting of ethylene and propylene at a temperature of 25–250° C., preferably 75–200° C. Then the more stable monoalklysilane was isolated by fractional distillation. This fractionated monoalkylsilane was then treated with an olefin at a temperature of 250–450° C., preferably at 300–450° C. to introduce a second alkyl group. The dialkylsilane produced was purified by distillation.

PROCESS II

The first alkyl group was introduced by the reaction of silane with a member of the group consisting of ethylene and propylene at a temperature of 25–250° C., preferably 75–200° C. Then unreacted silane was removed from the reaction mixture by fractional distillation. Thereupon the monoalkylsilane remaining in the reaction mixture was treated with an olefin to introduce the second alkyl group at a temperature of 250–450° C., preferably at 300–450° C. The dialkylsilane was separated by fractional distillation.

In either of these processes, silane is advantageously absent from the reaction mixture when the temperature is raised above 250° C. since it decomposes to yield products which reduce the yield of the dialkylsilane.

Monoalkylsilane, suitable for olefin dialkylation, can be prepared by methods other than by the reaction of olefins with silane. For example, either ethyltrichlorosilane or propyltrichlorosilane may be reduced to monoalkylsilanes by suitable reducing agents, such as lithium hydride (LiH) and lithium aluminum hydride ($LiAlH_4$) by a method of Finhold et al., J. Amer. Chem. Soc., 69, pages 2692–6 (1947). Monoalkylsilanes produced by this process can be further alkylated to dialkylsilanes with ethylene or propylene.

Stoichiometrically, one mole of olefin per mole of silane is required for each step in the dialkylation of silane. In both mono- and dialkylation of silane, excesses of 5 or more moles of olefin per mole of silane in the first step or monoalkylsilane in the second step can be used, provided each alkylation is carried out in the proper temperature range (e. g., 25–250° C. for monoalkylation, 250–450° C. for dialkylation). However, in the further alkylation of monoalkylsilane with olefins to form the dialkylsilane, we prefer to use slightly less than 1 mole of olefin to 1 mole of monoalkylsilane since this tends to increase the yield of dialkylsilanes by decreasing the amount of tri- and tetraalkylsilanes formed as by-products of the reaction.

Each step in the olefin alkylation of silane may be carried out as either a batch or a continuous process. Because of the gaseous nature of silane, monoalkylsilane, ethylene, and propylene, super-atmospheric pressure apparatus has been used in the batch process. However, the gaseous nature of the reactants easily lends itself to a continuous process whereby the reactants are passed simultaneously over a heated zone. The continuous process can be carried out at either atmospheric or super-atmospheric pressure.

In order that those skilled in the art may better understand how the present invention may be practiced, the following examples are given by way of illustration and not by way of limitation. All parts are by weight.

Example 1

A mixture of 1 part of silane ($SiH_4$) and 15 parts ethylene was charged to a pressure reactor, the reactor closed and heated to a temperature of 120° C. for about 24 hours. The resulting product was fractionally distilled in a Podbielniak low temperature column to yield ethylsilane ($C_2H_5SiH_3$) having a boiling point around −55.5° C. In addition to the monoethyl derivative, there was also obtained a higher boiling material comprising higher alkylated silicon compounds, for instance, the di- and triethylsilanes.

Example 2

A 500 cc. stainless steel bomb was charged with 1500 ml. of monoethylsilane at 54.6 pounds absolute pressure (14.9 grams, 0.25 M) and 500 ml. of ethylene at 114.6 pounds absolute pressure (4.7 grams, 0.17 M), a total of 19.6 grams. The bomb was heated to 370–375° C. for a period of 4 hours during which time the pressure rose to a maximum of 400 p. s. i. and dropped to 275 p. s. i. gradually after 3 hours, remaining constant for the last hour. After the reaction, the bomb contained no appreciable amount of non-condensable gas, indicating little silane decomposition. Distillation of the liquid products in a Podbielniak low temperature fractionating column yielded 0.2 gram of unreacted ethylene, 6.2 grams of unreacted monoethylsilane, 7.5 grams of diethylsilane, 1.9 grams of triethylsilane and 0.8 gram of tetraethylsilane, plus 1.8 grams of high boiling residue. The total recovered material amounted to 18.4 grams. The amount of diethylsilane isolated represented 62.5% of the total product weight. The monoethylsilane (present in excess) had reacted with 96% of the ethylene charge. The yield of diethylsilane, based on reacted monoethylsilane, was 59%.

The unreacted monoethylsilane was recycled, thus increasing the yield to over 80%, based on monoethylsilane reacted.

Example 3

Propylene was used in place of ethylene and the reactions were carried out in the manner of Example 1 to produce monopropylsilane ($C_3H_7SiH_3$). The second propyl group was introduced in the manner of Example 2 to yield dipropylsilane ($C_3H_7)_2SiH_2$).

Example 4

Ethylpropylsilane ($C_2H_5)(C_3H_7)SiH_2$ was prepared by reacting monoethylsilane, produced in Example 1, with propylene in the method described in Example 2.

The compositions prepared by our process can be used in the preparation of other compositions. Thus, the dialkylsilanes can be converted by aqueous alkalies to dialkylpolysiloxanes which can be converted into resins, oils, and rubbers which are useful as lubricants, hydraulic fluids, heat transfer media, hydrocarbon oil additive, electrical insulation materials, etc. These dialkylsilanes possess an advantage over dialkyldihalosilanes as intermediates in the preparation of dialkylpolysiloxanes since they are free of halides which are corrosive to iron and stainless steel reactors. A method of preparing organopolysiloxanes from Si—H bonded organosilanes by alkaline hydrolysis is disclosed in U. S. Patent 2,595,890.

What we claim as new and desire to secure by Letters Patent of the United States is:

1. A process of preparing dialkylsilane of the formula $R_2SiH_2$ where R is an alkyl radical selected from the group consisting of ethyl and propyl which comprises reacting a monoalkylsilane with a member of the group consisting of ethylene and propylene at a temperature of 250–450° C.

2. A process of preparing dialkylsilane of the formula $R_2SiH_2$ where R is an alkyl radical selected from the group consisting of ethyl and propyl which comprises (1) reacting a member of the group consisting of ethylene and propylene with silane at a temperature of 25–250° C., (2) removing the unreacted silane, (3) reacting the monoalkylsilane in the resulting mixture with a member of the group consisting of ethylene and propylene at a temperature of 250–450° C.

3. A process of preparing dialkylsilane of the formula $R_2SiH_2$ where R is an alkyl radical selected from the group consisting of ethyl and propyl which comprises (1) reacting a member of the group consisting of ethylene and propylene with silane at a temperature of 25–250° C., (2) separating the monoalkylsilane produced, (3) reacting this monoalkylsilane with a member of the group consisting of ethylene and propylene at a temperature of 250–450° C.

4. A process of preparing diethylsilane which comprises reacting monoethylsilane with ethylene at a temperature of 250–450° C.

5. A process of preparing diethylsilane which comprises (1) reacting ethylene with silane at 25–250° C., (2) removing the unreacted silane, (3) reacting the monoethylsilane in the resulting mixture with ethylene at a temperature of 250–450° C.

6. A process of preparing diethylsilane which comprises (1) reacting ethylene with silane at 25–250° C., (2) separating the monoethylsilane produced, (3) reacting this monoethylsilane with ethylene at a temperature of 250–450° C.

7. A process of preparing dipropylsilane which comprises reacting monopropylsilane with propylene at a temperature of 250–450° C.

8. A process of preparing dipropylsilane which comprises (1) reacting propylene with silane at 25–250° C., (2) removing the unreacted silane, (3) reacting the monopropylsilane in the resulting mixture with propylene at a temperature of 250–450° C.

9. A process of preparing dipropylsilane which comprises (1) reacting propylene with silane at 25–250° C., (2) separating the monopropylsilane produced, (3) reacting this monopropylsilane with propylene at a temperature of 250–450° C.

References Cited in the file of this patent

UNITED STATES PATENTS

| | | |
|---|---|---|
| 2,537,763 | Hurd | Jan. 9, 1951 |

FOREIGN PATENTS

| | | |
|---|---|---|
| 961,878 | France | Nov. 28, 1949 |